US011119215B2

(12) United States Patent
Bravo Orellana

(10) Patent No.: US 11,119,215 B2
(45) Date of Patent: Sep. 14, 2021

(54) MULTI-SPECTRAL LIDAR OBJECT TRACKING

(71) Applicant: Outsight SA, Paris (FR)

(72) Inventor: Raul Bravo Orellana, Paris (FR)

(73) Assignee: Outsight SA, Paris (FR)

( * ) Notice: Subject to any disclaimer, the term of this patent is extended or adjusted under 35 U.S.C. 154(b) by 0 days.

(21) Appl. No.: 16/735,452

(22) Filed: Jan. 6, 2020

(65) Prior Publication Data
US 2021/0208279 A1    Jul. 8, 2021

(51) Int. Cl.
G01S 17/66    (2006.01)
G01S 7/48    (2006.01)
G01S 17/931    (2020.01)

(52) U.S. Cl.
CPC ............ *G01S 17/66* (2013.01); *G01S 7/4802* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 5,745,437 A | * | 4/1998 | Wachter | G01S 17/10 |
| | | | | 342/127 |
| 5,926,773 A | * | 7/1999 | Wagner | G01J 3/28 |
| | | | | 250/339.12 |
| 6,302,355 B1 | * | 10/2001 | Sallee | F41G 7/2226 |
| | | | | 244/3.15 |
| 2006/0203248 A1 | * | 9/2006 | Reichardt | G01N 21/53 |
| | | | | 356/437 |
| 2015/0293032 A1 | * | 10/2015 | Babichenko | G01N 21/64 |
| | | | | 356/70 |

OTHER PUBLICATIONS

Che et al., "Object Recognition, Segmentation, and Classification of Mobile Laser Scanning Point Clouds: A State of the Art Review", Sensors 2019, 19, 810; doi:10 3390/s19040810, 42 pages.
Chen et al., "A 10-nm Spectral Resolution Hyperspectral LiDAR System Based on an Acousto-Optic Tunable Filter", Sensors 2019, 19, 1620; doi:103390/s19071620, 16 pages.

(Continued)

*Primary Examiner* — Hovhannes Baghdasaryan
(74) *Attorney, Agent, or Firm* — Daylight Law, P.C.

(57) ABSTRACT

We disclose systems and methods for object tracking which utilize a spectral response and a geometric aspect of a set of points. One method includes transmitting, with a multispectral lidar system, a multispectral light beam and analyzing a response, of a photodetector, to a return of the beam. The method also includes generating a point cloud with a set of points and determining a set of spectral responses of the set of points based on the analyzing of the response. The method also includes determining a set of material compositions for the set of points based on the set of spectral responses of the set of points. The method also includes grouping points in the set of points into groups based on both the set of material compositions and a geometric aspect of the set of points and creating one or more tracking object definitions using the groups.

22 Claims, 6 Drawing Sheets

(56) References Cited

OTHER PUBLICATIONS

Chen et al., "Hyperspectral lidar point cloud segmentationbased on geometric and spectral information", Optics Express, vol. 27, No. 17, Aug. 19, 2019, 17 pages.
Chen et al., "Multispectral LiDAR Point Cloud Classification:A Two-Step Approach", Remote Sens. 2017, 9, 373,; doi:10 3390/rs9040373, 17 pages.
Gong et al., "Investigating the Potential of Using the Spatial and SpectralInformation of Multispectral LiDAR for Object Classification", Sensors 2015, 15, Sep. 2, 2015, 21989-22002; doi:10.3390/s150921989, 14 pages.
Kaasalainen et al., "Towards multispectral, multi-sensor indoorpositioning and target identification", Electronics Letters, Jul. 20, 2017, vol. 53, No. 15, pp. 1008-1011.
Lee, "Classification of Lidar Data for Generating a High-Precision Roadway Map", The International Archives of the Photogrammetry, Remote Sensing and Spatial Information Sciences, vol. XLI-B3, 2016 XXIII ISPRS Congress, Jul. 12-19, 2016, Prague, Czech Republic, 5 pages.
Lehtomaki et al., "Object Classification and Recognition From Mobile Laser Scanning Point Cloudsin a Road Environment", IEEE Transactions on Geosciene and Remote Sensing, vol. 54, No. 2, Feb. 2016, 14 pages.
Puttonen et al., "Artificial target detection with a hyperspectral LiDAR over 26-h measurement", Optical Engineering 5491), 013105, Jan. 2015, Downloaded from https://www.spiedigitallibrary.org/journals/Optical-Engineering on Sep. 6, 2017, 16 pages.
Zhang et al., "Lidar-based Object Classification with Explicitocclusion Modeling", arXiv:1907.04057v2 [cs.RO], Jul. 10, 2019, 12 pages.

\* cited by examiner

| Tracking Object Definition | Geometric Aspect | Material Composition |
|---|---|---|
| "Pedestrian #1" | 🚶 | 80% Cotton 20% Skin |
| "Trashcan #1" | 🗑 | 95% Plastic 5% Aluminum |

200

| Tracking Object Definition | Geometric Aspect | Material Composition |
|---|---|---|
| "Object 1" | 🚶 | 80% Cotton 20% Skin |
| "Object 2" | 🗑 | 95% Plastic 5% Aluminum |

Store Library of Spectral Responses 501 → Determine Material Compositions Using Library of Spectral Responses 502

Apply Minimum Distance Analysis 503

550

| Material | Component #1 | Component #2 | Component #3 | Component #4 |
|---|---|---|---|---|
| Snow | 1.9 | 0.9 | 0.9 | 0.9 |
| Ice | 0.8 | 0.5 | 0.5 | 0.5 |
| Cotton | 5.0 | 3.8 | 3.9 | 3.9 |
| Plastic | 1.5 | 1.1 | 1.4 | 0.7 |
| Asphalt | 2.0 | 4.0 | 2.1 | 2.1 |
| Skin | 5.0 | 2.1 | 2.7 | 1.9 |

MULTI-SPECTRAL LIDAR OBJECT TRACKING

BACKGROUND

Object tracking is an evolving field within computer vision that has increasingly broad applications in today's technology enhanced world. The importance of object tracking is demonstrated by its use in a variety of modern technologies including but not limited to autonomous and semi-autonomous vehicles, advanced driver assistance systems, human-computer interaction, gesture recognition, and video surveillance. Developing better object tracking systems therefore advances other areas of technology that create benefits such as safety and convenience.

This disclosure relates to all object tracking systems. Two types of object tracking systems are discussed as follows strictly for purposes of explaining the related art and not as limiting examples of the scope of applicability of the approaches disclosed herein. In two-dimensional imaging systems, a two-dimensional object is recognized using algorithms that perform image analysis and the object is represented by a set of points encoded as a cluster of pixels in the image. The object's movement can be tracked using image processing techniques that include but are not limited to contour detection, feature detection, convolution filters, or color or intensity thresholds. Multiple objects can be tracked over a succession of images (e.g., multiple frames of a video stream). In three-dimensional imaging systems, similar techniques can be applied using sensors such as radar or light imaging detection and ranging (LIDAR) that provide a three-dimensional point cloud data to represent the object. However, the sparse nature of the three-dimensional data collected in this manner can make object tracking somewhat more challenging.

SUMMARY

Object tracking systems are disclosed herein that utilize a spectral response and a geometric aspect of a set of points to track objects. The object tracking systems can group points in the set of points into one or more groups and create one or moretracking object definitions. The tracking object definitions define a specific and unique object to be tracked by the system. The tracking object definition can then be used to uniquely track that object to the exclusion of other objects that may be detectable by the object tracking system. In specific embodiments of the invention, the object tracking system uses a multi-spectral LIDAR to obtain the spectral response and geometric aspect of the set of points. For example, the multi-spectral LIDAR could transmit beams of light at multiple frequencies, or a single beam comprising multiple frequencies, at each point in a set of points, analyze their response, and utilize that analysis to determine both the spectral response and position of each point in the set of points from the same set of sounding signals.

Current object tracking systems face problems when tracking moving objects in three-dimensional space. For example, a three-dimensional imaging system provides a set of fewer points to represent an object as compared to a two-dimensional imaging system. The number of points provided by a three-dimensional imaging system to represent an object is therefore sometimes insufficient for standard image processing approaches. As a result, three-dimensional imaging systems cannot properly track objects in certain situations including but not limited to when the trajectories of the objects are interrupted because of occlusion or when the objects cross paths with one another.

FIG. 1 includes a series of frames of input provided to an object tracking system in two different object tracking scenarios in accordance with the related art. In the first scenario 100, two objects, 105 and 106, each represented by a different set of pixels approach each other 101, become contiguous or slightly overlapping 102, cross paths 103, and finally separate 104. As illustrated, the object tracking system is able to track the two objects as they approach one another and begin to overlap but then fails to distinguish between the two objects once they cross paths. The object tracking system may even aggregate both sets of pixels as a single object. Thus, when the two objects separate after crossing paths, ambiguity exists in terms of tracking the two objects and identifying which set of pixels represents which object. Similarly, in the second scenario 110, two objects, 115 and 116, each represented by a different set of pixels both follow a trajectory that approaches an obstruction 117 from the left 111, become partially occluded 112, become fully occluded 113, and then reemerge from the obstruction 114. As illustrated, the object tracking system is able to track the two objects as they approach and start to become occluded by the obstruction. However, once both objects are fully occluded by the obstruction, i.e. "go dark," they are no longer visible to the object tracking system. When both objects reemerge from behind the obstruction, ambiguity exists in terms of tracking the two objects and identifying which set of pixels represents which object. In the case where only one object reemerges from behind the obstruction after "going dark," ambiguity also exists in being able to know which of the two objects is the one that reemerged.

In specific embodiments of the invention disclosed herein, an object tracking system can overcome the drawbacks of prior object tracking systems by utilizing tracking object definitions based on both a geometric aspect of a set of points and a spectral response of that set of points. Each tracking object definition defines a specific and unique object to be tracked by the system and can be used to uniquely track that object to the exclusion of other objects that may be detectable by the object tracking system. Therefore, the object tracking system is able to keep track of objects even if objects cross paths, become occluded by obstruction, or otherwise need to be retracked after "going dark."

FIG. 2 includes a table 200 of tracking object definitions and a series of frames of input provided to an object tracking system in accordance with specific embodiments of the invention disclosed herein. Each row in the table corresponds with a unique and specific object in the object tracking system and provides the following information for that object: a tracking object definition in the left column, a geometric aspect in the middle column, and a material composition in the right column. For example, the first row of table 200 corresponds with a pedestrian 220 that has a tracking object definition of "Pedestrian #1," a geometric aspect in the shape of a person, and a material composition of 80% cotton and 20% skin. As used herein, the term tracking object definition refers to the title of the definition (e.g., "Pedestrian #1") as well as the association of that title with the geometric aspect, material composition, and any other information stored in association with that title. Similarly, the second row of table 200 corresponds with a trashcan 230 that has a tracking object definition of "Trashcan #1," a geometric aspect in the shape of a trashcan, and a material composition of 95% plastic and 5% aluminum. Scenario 210 shows the pedestrian approaching the trashcan 211, reaching the trashcan 212, picking up the trashcan 213, and finally putting down the trashcan 214. As illustrated, the object tracking system is able to successfully recognize and track both the pedestrian and the trashcan by disambiguating between the two objects based on the geometric aspect and material composition information in table 200 associated with each object's specific tracking object definition.

In specific embodiments of the invention, the tracking object definitions identify specific and unique objects without conducting a classification or recognition of the object. In the example above in FIG. 2, and as shown in table 220, the first tracking object definition could just be "Object 1" without having to recognize that the object is a pedestrian. In these embodiments, the creation of the tracking object definitions and the usage of those definitions to track objects can be conducted at higher speeds, at least in part because there is no need to provide the data to a classifier, and with a sparser data set as compared to approaches in which objects are classified and broken into specific categories.

In specific embodiments, a method for object tracking is provided. Each step of the method is performed by a multispectral LIDAR system. The method includes transmitting, with the multispectral LIDAR system, a multispectral light beam. The method also includes analyzing a response, of a photodetector, to a return of the multispectral light beam. The method also includes, based on the analyzing of the response, (i) generating a point cloud with a set of points and (ii) determining a set of spectral responses of the set of points. The method also includes, based on the set of spectral responses of the set of points, determining a set of material compositions for the set of points. The method also includes, based on both (i) the set of material compositions and (ii) a geometric aspect of the set of points, grouping points in the set of points into one or more groups. The method also includes creating one or more tracking object definitions using the one or more groups.

In specific embodiments, another method is provided. The method includes transmitting a multispectral light beam. The method also includes analyzing a return of the multispectral light beam. The method also includes, based on the analyzing, (i) generating a set of points with three dimensional coordinates and (ii) determining a set of spectral responses of the set of points. The method also includes, based on the set of spectral responses of the set of points, determining a set of material compositions for the set of points. The method also includes creating one or more tracking object definitions using (i) the set of material compositions and (ii) a geometric aspect of the point cloud.

In specific embodiments, a system for object tracking is provided. The system includes a multispectral light beam transmitter that transmits a light beam. The system also includes a photodetector arranged to receive a return of the multispectral light beam. The system also includes a segmentation processing system. The segmentation processing system is programmed to analyze a response, of a photodetector, to a return of the multispectral light beam. The segmentation processing system is also programmed to, based on the analyzing of the response, (i) generate a point cloud with a set of points and (ii) determine a set of spectral responses of the set of points. The segmentation processing system is also programmed to, based on the set of spectral responses of the set of points, determine a set of material compositions for the set of points. The segmentation processing system is also programmed to, based on both (i) the set of material compositions and (ii) a geometric aspect of the set of points, group points in the set of points into one or more groups. The segmentation processing system is also programmed to create one or more tracking object definitions using the one or more groups.

BRIEF DESCRIPTION OF THE DRAWINGS

FIG. 5 illustrates a library of spectral responses that can be used to determine a material composition of a point in accordance with specific embodiments of the invention disclosed herein.

DETAILED DESCRIPTION

Systems and methods involving object tracking which utilize a spectral response and a geometric aspect of a set of points to track objects in accordance with the summary above are disclosed below. In specific embodiments of the invention, the sensing system utilized by the object tracking system is a multi-spectral LIDAR system. The specific embodiments of these systems and methods disclosed in this section are provided for explanatory purposes and are not meant to limit the invention, the scope of which is provided by the appended claims.

In specific embodiments of the invention, an environment is first sampled to obtain data regarding the environment. The data can include a spectral response regarding a set of points in the environment and geometric information regarding points in the environment. The geometric information can include a location of those points relative to each other or relative to a common reference frame. Throughout this disclosure, the example of a multispectral LIDAR system is provided as an example of a sampling system that can obtain this information. However, the approaches disclosed herein are more broadly applicable to any system that can obtain spectral responses and geometric information regarding an environment in which objects are to be tracked.

Figure 1:
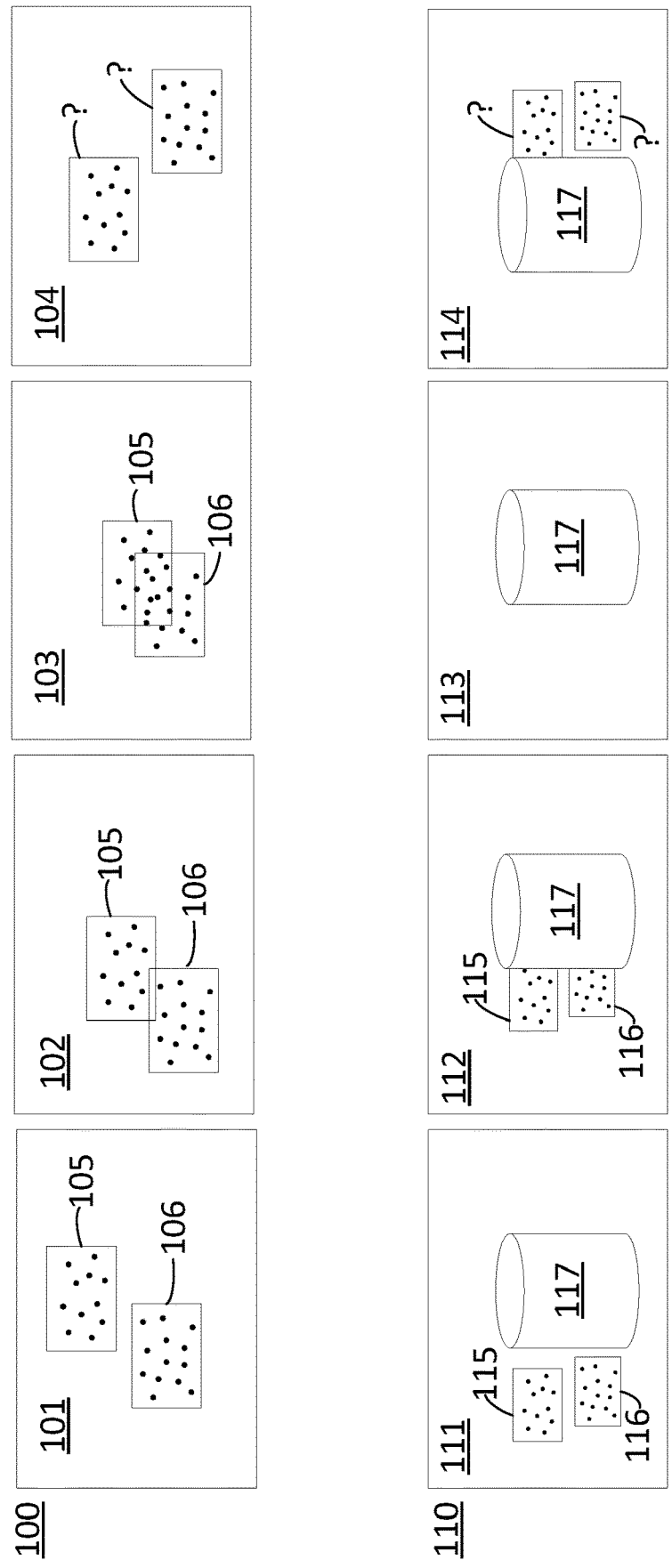
FIG. 1 illustrates a series of frames of input provided to an object tracking system in two different object tracking scenarios in accordance with the related art.
Figure 2:
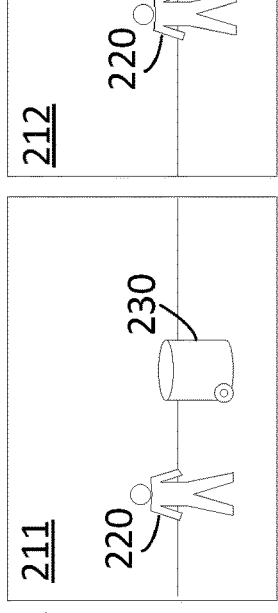
FIG. 2 illustrates a table of tracking object definitions and a series of frames of input provided to an object tracking system in accordance with specific embodiments of the invention disclosed herein.
Figure 2:
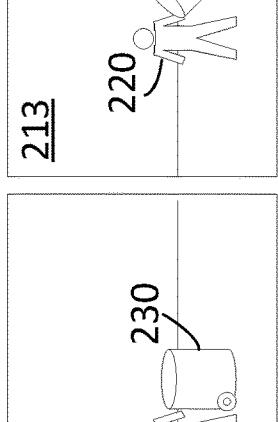
Figure 2:
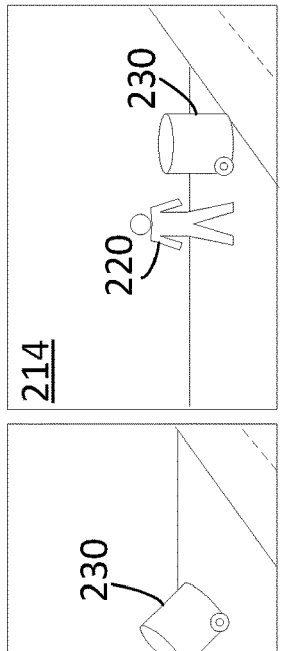
Figure 2:
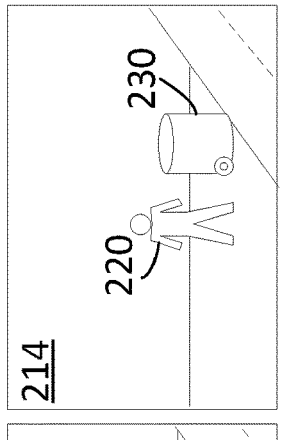
Figure 3:
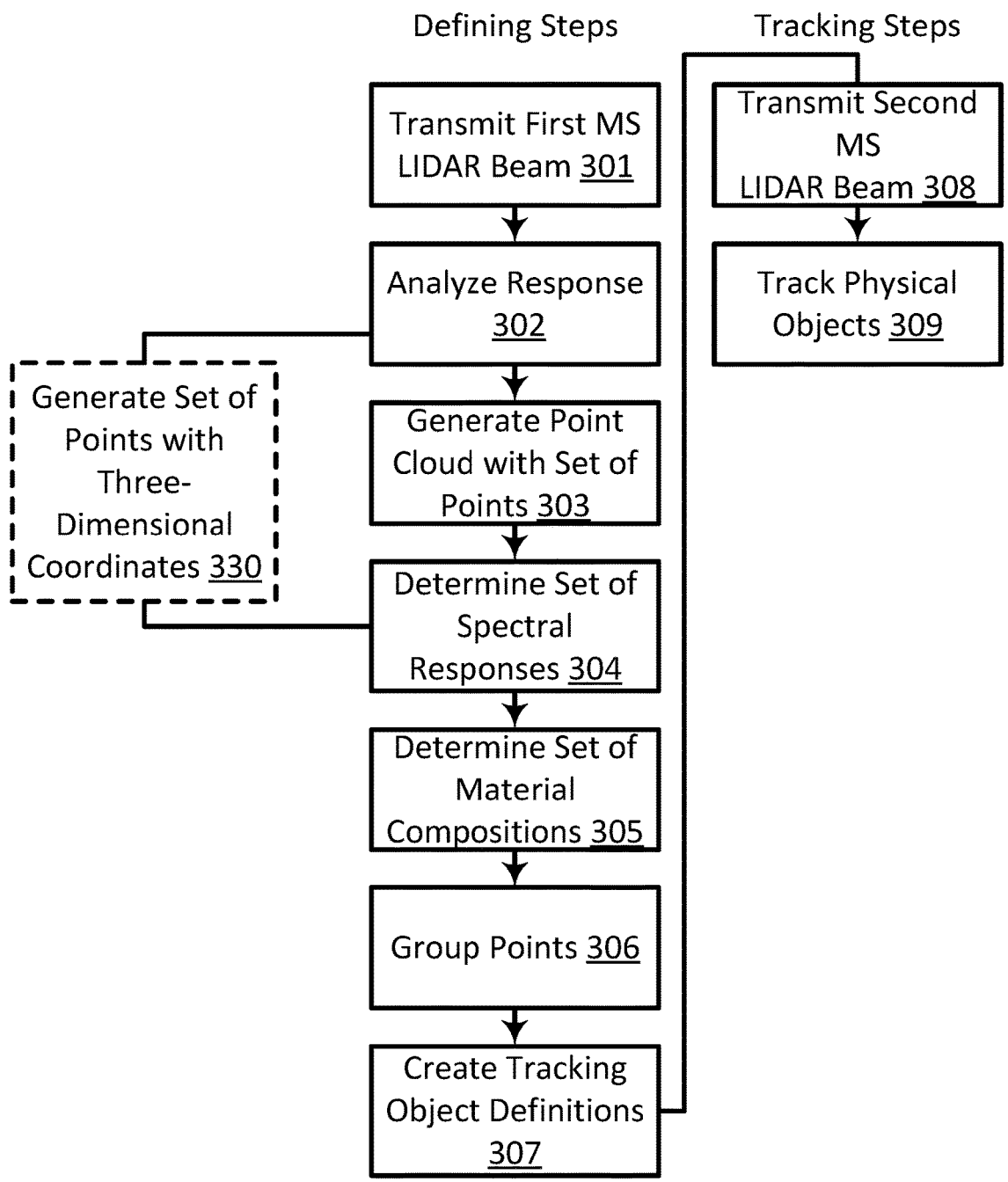
FIG. 3 illustrates a flow chart for a set of methods for creating tracking object definitions and tracking objects using those definitions in accordance with specific embodiments of the invention disclosed herein.

FIG. 3 includes a flow chart 300 for a set of methods for creating tracking object definitions and tracking objects using those definitions in accordance with specific embodiments of the invention disclosed herein. The flow chart includes optional steps with dashed boundaries. The flow chart serves as an outline for the remainder of this disclosure. The flow chart begins with steps taken to sample and analyze the environment to obtain information regarding one or more physical objects, proceeds with steps taken to create one or more tracking object definitions, and concludes with steps taken to track one or more physical objects using the one or more tracking object definitions.

Flow chart 300 begins with steps taken to sample and analyze the environment to obtain information regarding one or more physical objects. The steps can be executed by a sensing system. In specific embodiments of the invention, the sensing system is an object tracking system. The object tracking system can include a multispectral light beam transmitter, a photodetector, and a segmentation processing system. In the example of FIG. 3, flow chart 300 begins with step 301, in which an object tracking system transmits a multispectral light beam with a multispectral light beam transmitter.

Flow chart 300 continues with step 302 in which a response, of a photodetector, to a return of the multispectral light beam transmitted in step 301 is analyzed. The return of the light beam will include information regarding the properties of the object because the manner in which the light is reflected changes the properties of the light in a manner that depends on the properties of the object. The photodetector can include a single hardware element or multiple elements. Depending upon the characteristics of the signal transmitted in step 301, the photodetector can sense multiple signals sent at different times or analyze multiple spectra of light which are received at the same time. In specific embodiments of the invention, a segmentation processing system is programmed to perform the analysis. The analysis can include determining an intensity of light reflected from an object, a phase shift of light reflected from an object, or a frequency shift of light reflected from an object. Depending upon the characteristics of the signal transmitted in step 301, the analysis can determine any of the variables mentioned in the prior sentence across multiple frequencies and/or intensities of light.

Flow chart 300 continues with step 303 in which, based on the analyzing of the response in step 302, a point cloud with a set of points is generated. In specific embodiments of the invention, a set of points with three-dimensional coordinates is generated in step 330. In specific embodiments of the invention, a segmentation processing system is programmed to conduct step 303. The segmentation processing system can conduct this action by conducting a time of flight analysis on the signals transmitted in step 301 and received in step 302 along with stored information regarding an angle at which the signals were transmitted. The analysis can include transmitting the signal at a known angle and at a known time and calculating a distance and location of the point at which the signal was reflected back to the transmitter using trigonometric and range finding calculations. The analysis can alternatively or additionally include conducting an angle of reception analysis in which an angle at which a signal is received in step 302 is directly measured, the angle of transmission of the signal in step 301 is a known value, and the distance separating the detector for step 302 and the transmitter for step 301 is used along with trigonometric calculations to determine the location of the point at which the signal was reflected back.

Figure 4:
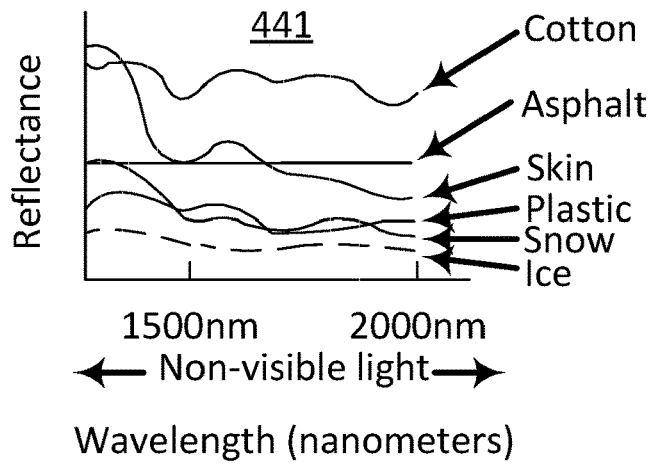
FIG. 4 illustrates a process for determining a spectral response for a set of points in accordance with specific embodiments of the invention disclosed herein.
Figure 4:
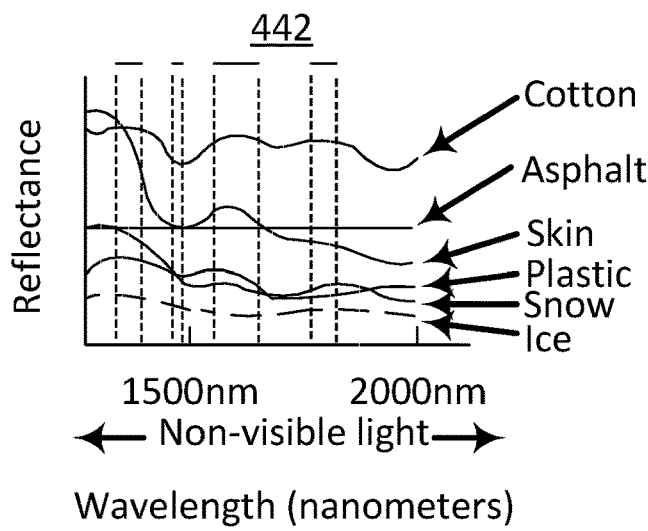
Figure 4:
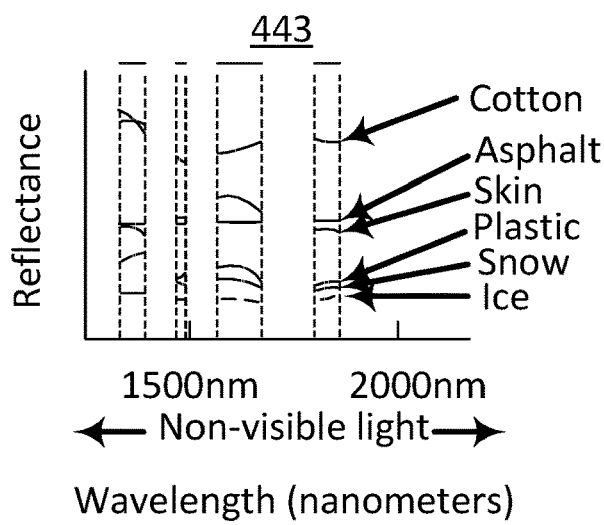

Flow chart 300 continues with step 304, in which, based on the analyzing of the response in step 302, a set of spectral responses of the set of points generated in step 303 is determined. FIG. 4 includes a process for determining a spectral response for a set of points in accordance with specific embodiments of the invention disclosed herein. In the example of FIG. 4 and with reference to FIG. 3, a multispectral LIDAR system for object tracking performs the process by first performing steps 301 through 303. In step 301, the multispectral LIDAR system transmits a multispectral light beam with a multispectral light beam transmitter. The multispectral light beam transmitter can transmit beams of light at multiple frequencies or a single beam comprising multiple frequencies. According to a specific embodiment, the multispectral light beam transmitter emits infrared light in the 1000 nm to 2000 nm range. In step 302, the multi-spectral LIDAR system analyzes a response, of a photodetector, to a return of the multispectral light beam. A graph of a sample response is shown in graph 441.

FIG. 4 includes a flowchart 400 for a method for analyzing the response in accordance with specific embodiments of the invention disclosed herein. Flowchart 400 begins and finishes with step 401 and would be conducted as a sub-step of step 302 in flow chart 300, in which analyzing the response includes applying a set of wavelength filters to the response. For example and as shown in graph 442, four ranges of wavelength filters can be applied to the response. In specific embodiments of the invention, the set of wavelength filters includes a bandpass filter which passes infrared light. The intensity corresponding to each range of wavelength can be measured as part of the analyzing in step 302. Based on the analyzing, a set of spectral responses of the set of points can be determined in step 304. A graph of a sample set of spectral responses is shown in graph 443. In specific embodiments of the invention, a segmentation processing system is programmed to determine the set of spectral responses of the set of points by conducting the steps illustrated in FIG. 4.

Flowchart 300 continues with step 305, in which, based on the set of spectral responses of the set of points determined in step 304, a set of material compositions for the set of points is determined. FIG. 5 includes flowchart 500 for a set of methods for determining a material composition of a point by using a library of spectral responses in accordance with specific embodiments of the invention disclosed herein. Flowchart 500 begins with step 501, in which a library of spectral responses is stored. In specific embodiments of the invention, the library of spectral responses is stored in a memory of the object tracking system. FIG. 5 includes a table 550 that shows an example of a library of spectral responses for certain materials. The library can be generated based on observations conducted in a lab and can be hard coded into the object tracking system. Alternatively, the library could be stored in memory and could be updated via a network connection as additional materials were analyzed.

Flowchart 500 finishes with step 502, in which the library of spectral responses is used to determine the set of material compositions for the set of points. For example, determining the set of material compositions for the set of points can be done by looking up the set of spectral responses for the set of points using the library of spectral responses. The set of spectral responses can also be rounded prior to the lookup. Determining the set of material compositions for the set of points can also be done in other ways, including setting rules with thresholds. For example, if component one exceeded component four while component four was less than component three, the system could determine that the material composition of a point with that response was skin. Based on the number of materials in the library, the rules could be more complex. The spectra could also be selected based on a desire to minimize the complexity of the rules and further distinguish the materials. For example, the filters applied in step 401 could be selected to choose spectra that most clearly distinguished a set of materials that the system was being optimized to filter and track. In specific embodiments of the invention, a segmentation processing system is programmed to determine the set of material compositions for the set of points using the rules and processes described above.

In specific embodiments of the invention, the set of spectral responses detected by the sensing system is a set of spectral response vectors, and the library of spectral responses stored in step 501 is a library of spectral response vectors. In these embodiments, determining the set of material compositions for the set of points in step 502 could then include applying minimum distance analysis to a set of spectral response vectors in the library of spectral response vectors as in sub-step 503.

In specific embodiments of the invention, the set of spectral responses of the set of points in the point cloud are normalized into a set of normalized spectral responses before determining the set of material compositions for the set of points using the set of normalized spectral responses. A set of spectral responses can be normalized to account for the distance of the reflecting object because objects at a greater distance return a lower spectral response. The geometric information obtained regarding the points can be utilized in the associated routines. Similarly, a set of spectral responses can be normalized to account for atmospheric conditions (such as fog) that can also lower an object's spectral response. Wavelengths that are more susceptible to the atmospheric condition can thereby be adjusted up or down to counteract the bias introduced by the condition. The atmospheric condition can be detected by a separate system such as a visible light camera or a connection to an external network with knowledge of the position of the sensing system and the local conditions of that position (e.g., an Internet weather monitoring system). In specific embodiments of the invention, the atmospheric conditions can be detected using the same sensing system during a calibration step which targets a known surface such as a calibration target. The calibration target could be positioned within the range of the sensing system such as on a vehicle the sensing system was located on. In specific embodiments of the invention, the set of spectral responses of the set of points in the point cloud are normalized into a set of normalized spectral responses after detecting the atmospheric condition, and the determining of the set of material compositions for the set of points uses the set of normalized spectral responses that have been normalized based on the atmospheric condition.

Flow chart 300 continues with step 306, in which, based on both (i) the set of material compositions from step 305 and (ii) a geometric aspect of the set of points, the set of points is grouped into one or more groups. A geometric aspect of a set of points can be any geometric factor related to the points. For example, the aspect could be a set of distances between the set of points determined by calculating the distance between the points in the point cloud generated in step 303. As another example, the geometric aspect could be a shape outlined by the set of points or an edge defined by the set of points. Regardless, grouping the set of points into one or more groups can be done with algorithms that take into account geometric aspects of the points as well as material compositions. For example, a human hand in contact with an aluminum trash can could be grouped as a separate object even if the objects were in contact while the head and hind quarters of a dog could be grouped together even if the body of the dog were occluded and the two objects appeared to be geometrically separate.

In specific embodiments of the invention, points are grouped using various approaches. The set of material compositions and the geometric aspect of the set of points can be combined in different ways to group the set of points into one or more groups. In one set of approaches, the values for material compositions and geometry can be treated separately with one set of data being used to create constraints for analyzing the other set. For example, one approach could involve setting a threshold for material composition variation across a set distance (i.e., a large change in material composition over a short distance indicates a change in objects). In another set of approaches, values for material compositions and geometry can be combined prior to grouping. For example, a fixed value could be assigned for the response of a point to the various spectra and the set of fixed values are treated as coordinates in X dimensional space along with the x, y, z location coordinates. Various grouping techniques can be applied to a combined data set or with one data set setting the constraints for grouping the other data set. These techniques can include but are not limited to thresholding, edge detection, nearest neighbor, and branching algorithms. For example, all contiguous points with the same material composition, or nearly the same material composition within a certain threshold, can be grouped. As another example, all points forming a contour or boundary of an object and having the same material composition can be grouped. As another example, points with the same material composition can be grouped when they are part of certain geometric aspects (e.g., when an object is in motion) but not when they are part of other geometric aspects (e.g., when an object is at rest). The spectra and geometric aspect data can be normalized prior to the execution of those techniques. In specific embodiments of the invention, a segmentation processing system is programmed to group the set of points into one or more groups.

In specific embodiments of the invention, the tracking object definitions identify specific and unique objects without conducting a classification or recognition of the object. The one or more tracking object definitions can be one or more generic object definitions, and the steps used to generate the tracking object definitions do not have to include any classification of the tracked objects. Similarly, the step of grouping points in the set of points into one or more groups can only use the set of material compositions and the set of distances, and the step of tracking one or more physical objects does not include any classification of the one or more physical objects. In these embodiments, the creation of the tracking object definitions and the usage of those definitions to track objects can be conducted at higher speeds, at least in part because there is no need to provide the data to a classifier, and with a sparser data set as compared to approaches in which objects are analyzed and broken into specific categories.

Flow chart 300 continues with step 307, in which tracking object definitions are created using the one or more groups from step 306. As mentioned in the prior paragraph, this process can be executed without conducting a classification. For example, step 307 can include assigning a generic but unique string of characters to a group of points as grouped in the execution of step 306 and saving the resulting association and definition to memory for purposes of tracking the object. Alternatively, this process can include a classification step in which an object is recognized as belonging to a specific class of objects (e.g., human, car, animal, bike, etc.). The process can be conducted by providing the spectral response and geometric aspect of a given group to a classifier that has been configured to identify a set of classes. A segmentation processing system can be programmed to create the one or more tracking object definitions by including such a classifier or by being a simple script for assigning unique strings to groups.

Flow chart 300 continues with step 308, in which an object tracking system transmits a second multispectral light beam with a multispectral light beam transmitter. The second multispectral light beam is transmitted after transmitting the first multispectral light beam in step 301. The transmitter can be the same transmitter used for step 301 or a different transmitter. Flow chart 300 finishes with step 309, in which one or more physical objects are tracked using (i) a response of a photodetector to the second multispectral light beam; and (ii) the one or more tracking object definitions from step 307. An object can be matched with a tracking object definition using machine learning algorithms including but not limited to fuzzy logic, function approximators, and deep net algorithms. The one or more objects can be tracked across a series of frames of input (e.g., video) provided to the object tracking system. The tracking object definition corresponding with a unique and specific object can change from frame to frame as the object's geometry relative to a sensing system changes. In these approaches, the definitions from step 307 can be periodically or continuously updated at the same time the tracking of the associated objects is taking place through the execution of step 309. In specific embodiments of the invention, a tracking processing system is programmed to track the one or more physical objects. The tracking processing system can obtain geometric and spectral response information from a response to the second light beam and analyze that information in light of the tracking object definitions that were previously generated by the overall system. For example, the information can be applied as an input to a classifier where the classes of the classifier are the tracking object definitions previously generated by the system. If the classifier output a probability over a certain threshold for a given class, the system would recognize the response of the second light beam as illuminating the tracking object associated with that class.

In specific embodiments of the invention, usage of both a geometric aspect and spectral response of a set of points in order to define a tracking object provides certain benefits such as the ability to distinguish and continue to track objects that have merged or objects that have been occluded and then must be retracked after emerging. The one or more tracking object definitions can include two different tracking object definitions corresponding with two unique and specific physical objects. The two objects can be separately tracked by the tracking system even if they are contiguous in a point cloud illuminated by the sensing system as the two object have different material compositions. The set of material compositions can also include two different material compositions corresponding with the two objects. For example, one of the objects can have a material composition of 19% skin material, 78% cotton material and 3% unknown material, and the second of the objects can have a material composition of 93% plastic material, 2% aluminum and 5% unknown material. When the two objects' point clouds become contiguous (i.e. the two objects have merged or come into contact with each other), tracking the two objects in step 309 can include separately tracking each of the objects based on its tracking object definition and material composition. In specific embodiments of the invention, a tracking processing system is programmed to track the two objects.

In specific embodiments of the invention, a second multispectral light beam is transmitted after transmitting the first multispectral light beam in step 301. The second multispectral light beam can be transmitted with a multispectral LIDAR system. Using a response, of a photodetector, to a return of the second multispectral light beam and the one or more tracking object definitions, it can be determined that one or more physical objects is occluded. In specific embodiments of the invention, a tracking processing system is programmed to transmit, with the multispectral LIDAR system, a second multispectral light beam and to determine that one or more of the physical objects is occluded. This can occur if, for example, none of the groups of points illuminated by the second light beam are found to be sufficiently similar to one of the stored tracking object definitions.

Figure 6:
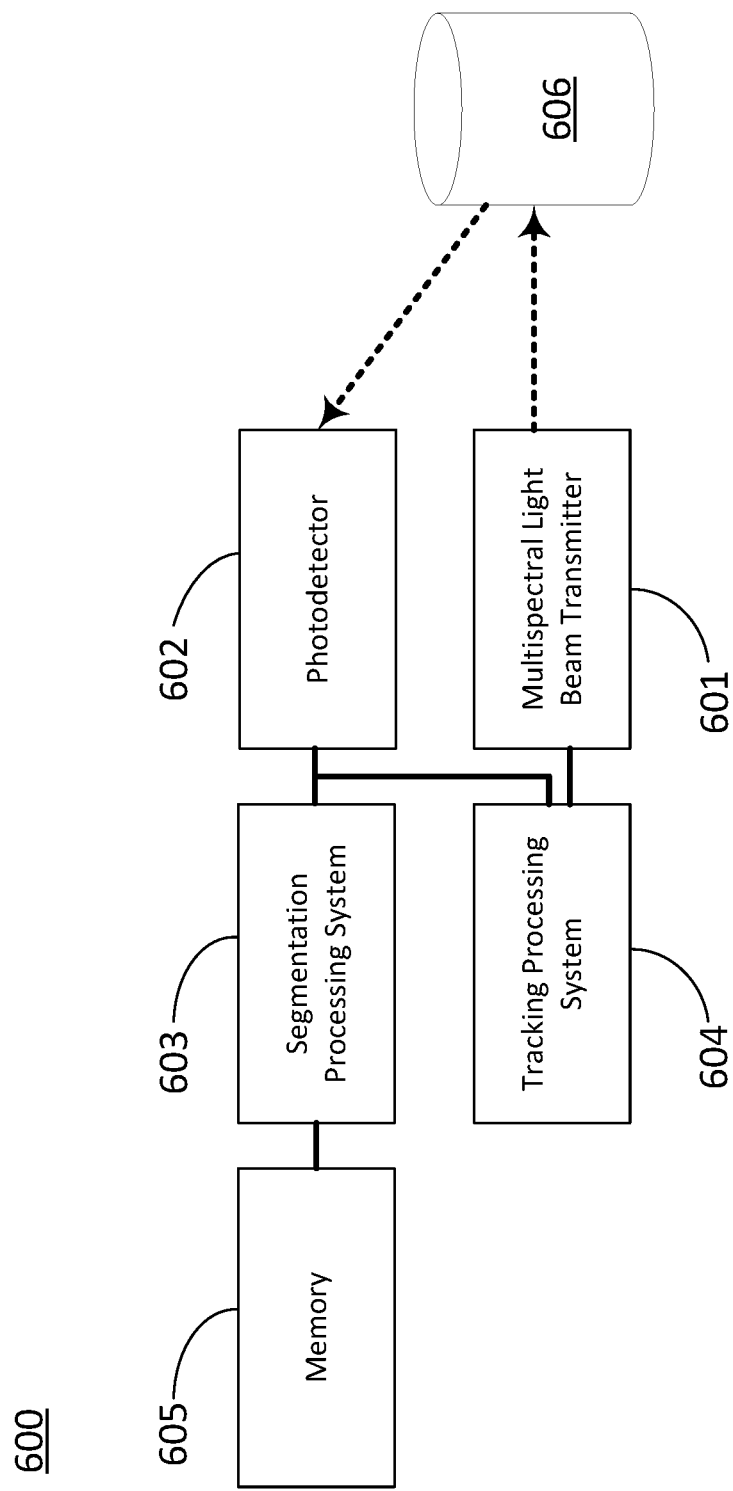
FIG. 6 illustrates a system for creating tracking object definitions and for tracking objects using those definitions in accordance with specific embodiments of the invention disclosed herein.

FIG. 6 presents a block diagram of an object tracking system that can be used in accordance with specific embodiments of the invention. FIG. 6 provides a multispectral LIDAR system for object tracking 600 with a multispectral light beam transmitter 601, a photodetector 602, a segmentation processing system 603, and a tracking processing system 604. The photodetector 602 can be a broadband detector configured to detect light responsive to all the different wavelengths that can be emitted by the multispectral LIDAR system 600. As illustrated, both the segmentation processing system 603 and the tracking processing system 604 can be configured to analyze a response of the photodetector 602 to a return of a multispectral light beam transmitted by the multispectral light beam transmitter 601. The return can be the reflection of the light beam off an object 606. Tracking processing system 604 can also be configured to transmit a light beam with multispectral light beam transmitter 601. The multispectral LIDAR system 600 can also include a memory 605 that is accessible to the segmentation processing system 603. The segmentation processing system and tracking processing system can be instantiated on one or more general purpose processor chips, microcontrollers, chip sets, or application specific integrated circuits. Memory 605 can be used to store the tracking object definitions and can be an internal memory of the same hardware on which segmentation processing system 603 is instantiated or on a separate external memory such as a flash memory chip.

In specific embodiments of the invention, the multispectral LIDAR system is embedded on a vehicle, and the physical objects being tracked are potential obstacles for the vehicle. For example, the obstacles could be pedestrians, other cars, street signs, roadside debris, and other items found on or near roadways. As mentioned previously, the object tracking system may track the position of these objects relative to the vehicle without identifying them as belonging to any of those categories using a classifier. In specific embodiments of the invention, the multispectral LIDAR system is a surveillance system, and the physical objects being tracked are moving objects in a surveillance area. For example, the physical objects could be animals, authorized personnel, or unauthorized intruders. Any system on which the object tracking system is embedded could be designed to take action based on the detection of an object in a specific location, the motion and speed of the object, or the size of the object. As none of these information sources require classification of the object they can be conducted rapidly. For example, motion of an object into the anticipated region of travel of a vehicle could be used to engage an emergency braking system, while motion of an object into a zone of interest in a surveillance system could cause the system to activate a higher resolution image capture and storage system.

While the specification has been described in detail with respect to specific embodiments of the invention, it will be appreciated that those skilled in the art, upon attaining an understanding of the foregoing, may readily conceive of alterations to, variations of, and equivalents to these embodiments. Although examples in the disclosure were generally directed to object tracking systems, the same approaches could be utilized by motion sensing systems and other detection systems. These and other modifications and variations to the present invention may be practiced by those skilled in the art, without departing from the scope of the present invention, which is more particularly set forth in the appended claims.

What is claimed is:

1. A method for object tracking, wherein each step is performed by a multispectral lidar system, comprising the steps of:
   transmitting, with the multispectral lidar system, a first multispectral light beam;
   analyzing a response, of a photodetector, to a return of the first multispectral light beam;
   based on the analyzing of the response: (i) generating a point cloud with a set of points; and (ii) determining a set of spectral responses of the set of points;
   normalizing, based on a distance to the points in the point cloud, the set of spectral responses of the set of points in the point cloud into a set of normalized spectral responses;
   determining a set of material compositions for the set of points using the set of normalized spectral responses;
   based on both: (i) the set of material compositions; and (ii) a geometric aspect of the set of points: grouping points in the set of points into two groups;
   creating two tracking object definitions using the two groups, wherein the two tracking object definitions include associated material composition information from the set of material compositions and geometric information of the geometric aspect;
   transmitting, with the multispectral lidar system and after transmitting the first multispectral light beam, a second multispectral light beam;
   tracking two physical objects using: (i) a response of the photodetector to the second multispectral light beam; and (ii) the two tracking object definitions;
   updating the two tracking object definitions for further tracking using the response of the photodetector to the second multispectral light beam;
   wherein the tracking step is different than the grouping step because: (i) the tracking step uses the two tracking object definitions to identify the two physical objects from the response to the second multispectral light beam; and (ii) the grouping step does not use any object definitions to group the set of points into two groups from the response to the first multispectral light beam;
   wherein the two tracking object definitions are definitions for the two physical objects;
   wherein the set of material compositions includes two different material compositions corresponding to the two physical objects;
   wherein the two physical objects are contiguous in the point cloud; and
   wherein tracking the two physical objects includes separable tracking of the two physical objects.

2. The method of object tracking from claim 1, wherein:
   the multispectral lidar system is embedded on a vehicle; and
   the two physical objects are potential obstacles for the vehicle.

3. The method of object tracking from claim 1, wherein:
   the multispectral lidar system is a surveillance system; and
   the two physical objects are moving objects in a surveillance area.

4. The method of object tracking from claim 1, further comprising:
   determining that one of the two physical objects is occluded using: (i) a response of the photodetector; and (ii) the two tracking object definitions.

5. The method of object tracking from claim 1, wherein:
   analyzing the response comprises: applying a set of wavelength filters to the response; and
   the set of wavelength filters include a bandpass filter which passes infrared light.

6. The method of object tracking from claim 1, further comprising:
   storing a library of spectral responses; and
   wherein determining the set of material compositions for the set of points uses the library of spectral responses.

7. The method of object tracking from claim 6, wherein:
   the set of spectral responses of the set of points is a set of response vectors;
   the library of spectral responses is a library of stored vectors; and
   determining the set of material compositions for the set of points comprises minimum distance analyses of the set of response vectors and the library of stored vectors.

8. The method of object tracking from claim 1, further comprising:
   detecting an atmospheric condition;
   wherein the normalizing of the set of spectral responses uses the atmospheric condition.

9. The method of object tracking from claim 1, wherein:
   the two tracking object definitions are two generic object definitions; and
   the steps used to generate the two tracking object definitions do not include any object classifications.

10. The method of object tracking from claim 1, wherein:
    the step of grouping points in the set of points into two groups only uses the set of material compositions and a set of distances; and
    the step of tracking two physical objects does not include any classification of the two physical objects.

11. A multispectral lidar system for object tracking, comprising:
    a multispectral light beam transmitter that transmits a first multispectral light beam and a second multispectral light beam;
    a photodetector arranged to receive a return of the first multispectral light beam and a return of the second multispectral light beam;
    a segmentation processing system programmed to:
      analyze a response, of the photodetector, to the return of the first multispectral light beam;
      based on the analyzing of the response to the return of the first multispectral light beam: (i) generate a point cloud with a set of points; and (ii) determine a set of spectral responses of the set of points;
      normalize, based on a distance to the points in the point cloud, the set of spectral responses of the set of points in the point cloud into a set of normalized spectral responses;
      based on the set of spectral responses of the set of points: determine a set of material compositions for the set of points, wherein determining the set of material compositions for the set of points uses the set of normalized spectral responses;
      based on both: (i) the set of material compositions; and (ii) a geometric aspect of the set of points: group points in the set of points into two groups; and
      create two tracking object definitions using the two groups, wherein the tracking object definitions include both material composition information and geometric aspect information;
a tracking processing system programmed to:
analyze the response, of the photodetector, to the return of the second multispectral light beam;
track, based on the analyzing of the response to the return of the second multispectral light beam and using the two tracking object definitions, two physical objects;
update the two tracking object definitions for further tracking using the response of the photodetector to the second multispectral light beam;
wherein the two tracking object definitions are definitions for the two physical objects;
wherein the tracking by the tracking processing system is different than the grouping by the segmentation processing system because: (i) the tracking uses the two tracking object definitions to identify the two physical objects from the response to the second multispectral light beam; and (ii) the grouping does not use any object definitions to group the set of points into two groups from the response to the first multispectral light beam;
wherein the set of material compositions includes two different material compositions corresponding to the two physical objects;
wherein the two physical objects are contiguous in the point cloud; and
wherein tracking the two physical objects includes separable tracking of the two physical objects.

12. The multispectral lidar system for object tracking from claim 11, wherein:
the multispectral lidar system is embedded on a vehicle; and
the two physical objects are potential obstacles for the vehicle.

13. The multispectral lidar system for object tracking from claim 11, wherein:
the multispectral lidar system is a surveillance system; and
the two physical objects are moving objects in a surveillance area.

14. The multispectral lidar system for object tracking from claim 11, wherein the tracking processing system is further programmed to:
determine that one of the two physical objects is occluded using: (i) a response of the photodetector; and (ii) the two tracking object definitions.

15. The multispectral lidar system for object tracking from claim 11, wherein:
analyzing the responses comprises: applying a set of wavelength filters to the response; and
the set of wavelength filters include a bandpass filter which passes infrared light.

16. The multispectral lidar system for object tracking from claim 15, further comprising:
a memory that stores a library of spectral responses; and
wherein determining the set of material compositions for the set of points uses the library of spectral responses.

17. The multispectral lidar system for object tracking from claim 11, further comprising:
a memory that stores a library of spectral responses; and
wherein determining the set of material compositions for the set of points uses the library of spectral responses.

18. The multispectral lidar system for object tracking from claim 17, wherein:
the set of spectral responses is a set of response vectors;
the library of spectral responses is a library of stored vectors; and
the determining of the set of material compositions for the set of points comprises minimum distance analyses of the set of response vectors and the library of stored vectors.

19. The multispectral lidar system for object tracking from claim 11, further comprising:
a memory that stores a library of spectral responses; and
wherein determining the set of material compositions for the set of points uses the library of spectral responses.

20. The multispectral lidar system for object tracking from claim 11, wherein the segmentation processing system is further programmed to:
detect an atmospheric condition;
wherein the normalizing of the set of spectral responses uses the atmospheric condition.

21. The multispectral lidar system for object tracking from claim 11, wherein:
the two tracking object definitions are two generic object definitions; and
the segmentation processing system does not conduct any classifications of the tracked objects.

22. The multispectral lidar system for object tracking from claim 11, wherein:
the grouping of points in the set of points into two groups only uses the set of material compositions and the geometric aspect; and
the tracking processing system does not conduct any classification of the two physical objects.

* * * * *